US009174587B2

United States Patent
Fan

(10) Patent No.: US 9,174,587 B2
(45) Date of Patent: Nov. 3, 2015

(54) POSITIONING APPARATUS FOR SEAT HEADREST POSTS IN VEHICLE

(71) Applicant: Eagle Fan, Chu-Pei (TW)

(72) Inventor: Eagle Fan, Chu-Pei (TW)

(*) Notice: Subject to any disclaimer, the term of this patent is extended or adjusted under 35 U.S.C. 154(b) by 199 days.

(21) Appl. No.: 13/964,339

(22) Filed: Aug. 12, 2013

(65) Prior Publication Data

US 2015/0041508 A1 Feb. 12, 2015

(51) Int. Cl.
*B60R 7/00* (2006.01)
*B60R 11/02* (2006.01)
*B60R 11/00* (2006.01)

(52) U.S. Cl.
CPC ........... *B60R 11/02* (2013.01); *B60R 2011/008* (2013.01); *B60R 2011/0017* (2013.01); *B60R 2011/0059* (2013.01)

(58) Field of Classification Search
CPC .. B60R 7/043; B60R 7/08; B60R 2011/0017; B60R 2011/0089; B60R 2011/00059
USPC .......................... 224/275, 558, 407, 409, 411
See application file for complete search history.

(56) References Cited

U.S. PATENT DOCUMENTS

| 4,159,092 | A | * | 6/1979 | DeLano | 248/276.1 |
| 7,152,834 | B2 | * | 12/2006 | Hsu | 248/230.1 |
| 7,364,230 | B2 | * | 4/2008 | Zheng | B60R 11/0235 297/188.2 |
| 8,678,680 | B1 | * | 3/2014 | Pelini | 396/428 |
| 2006/0032996 | A1 | * | 2/2006 | Wu | 248/218.4 |
| 2008/0296333 | A1 | * | 12/2008 | Brassard | 224/555 |
| 2011/0011910 | A1 | * | 1/2011 | Hsiao | 224/555 |
| 2012/0018471 | A1 | * | 1/2012 | Guillermo et al. | 224/275 |
| 2012/0274106 | A1 | * | 11/2012 | Ackeret et al. | 297/188.01 |
| 2012/0312847 | A1 | * | 12/2012 | LaColla | B60R 11/02 224/275 |
| 2013/0068809 | A1 | * | 3/2013 | Wang | 224/275 |

\* cited by examiner

*Primary Examiner* — Adam Waggenspack
(74) *Attorney, Agent, or Firm* — Rabin & Berdo, P.C.

(57) ABSTRACT

A positioning apparatus for seat headrest posts in vehicle is provided, including a retractable rod, two clamping units and a connection joint unit; wherein the retractable rod having an extendible rod able to extend and retract; a locking assembly being disposed on the outer surface of the retractable rod; the locking assembly being able to fasten the position after lateral adjustment of the retractable rod; the two clamping units being disposed on the retractable rod for clamping onto the posts of seat headrest; the connection joint unit being disposed to the end of the extendible rod for engaging an object to be mounted here. As such, when an electronic device, such as, tablet or thin screen display is mounted to the connection joint unit, the position of the electronic device can be adjusted by adjusting the length of the extendible rod for convenient viewing.

2 Claims, 7 Drawing Sheets

POSITIONING APPARATUS FOR SEAT HEADREST POSTS IN VEHICLE

FIELD OF THE INVENTION

The present invention generally relates to a positioning apparatus for seat headrest posts in a vehicle, and more specifically to a positioning apparatus able to adjust laterally so that the electronic device mounted on the positioning apparatus can be placed directly behind a front seat or between two front seats for sharing.

BACKGROUND OF THE INVENTION

As cars become a common transportation vehicle and portable electronic devices, such as, smart phone and tablet PC, become a mainstream communication and entertainment gadget, the use of portable devices in cars creates a demand in auxiliary apparatus for using portable devices in cars. While the driver using portable device may pose potential hazard, the passenger using portable device inside vehicle is a good way to stay entertained.

To provide good riding environment for backseat passengers, some manufacturers developed auxiliary apparatus applicable to seat backrest inside a vehicle. These known auxiliary apparatuses are often fastened to the posts supporting the headrest on the back of the seat backrest of the front seat for holding portable electronic device, such as, tablet, for viewing by the back seat passengers. However, such auxiliary apparatus is not convenient for two back seat passengers to view the same device, in particular, for the passenger not directly behind the front seat equipped with the auxiliary apparatus. It is desirable to devise a positioning apparatus able to provide different modes for a single passenger or for two or more passengers sharing the electronic device.

SUMMARY OF THE INVENTION

The primary object of the present invention is to provide a positioning apparatus for seat headrest posts in vehicle for mounting various electronic devices to the seat headrest posts. The positioning apparatus further provides the lateral adjustment function so that the mounted electronic device can be moved from directly behind a front seat to between the two front seats for convenient sharing of the mounted electronic device by two or more backseat passengers.

To achieve the above object, the present invention provides a positioning apparatus for seat headrest posts in vehicle, including a retractable rod, two clamping units and a connection joint unit; wherein the retractable rod having an extendible rod able to extend and retract; a locking assembly being disposed on the outer surface of the retractable rod; the locking assembly being able to fasten the position after lateral adjustment of the retractable rod; the two clamping units being disposed on the retractable rod for clamping onto the posts of seat headrest; the connection joint unit being disposed to the end of the extendible rod for engaging an object to be mounted here. As such, when an electronic device, such as, tablet or thin screen display is mounted to the connection joint unit, the position of the electronic device can be adjusted by adjusting the length of the extendible rod for convenient viewing.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
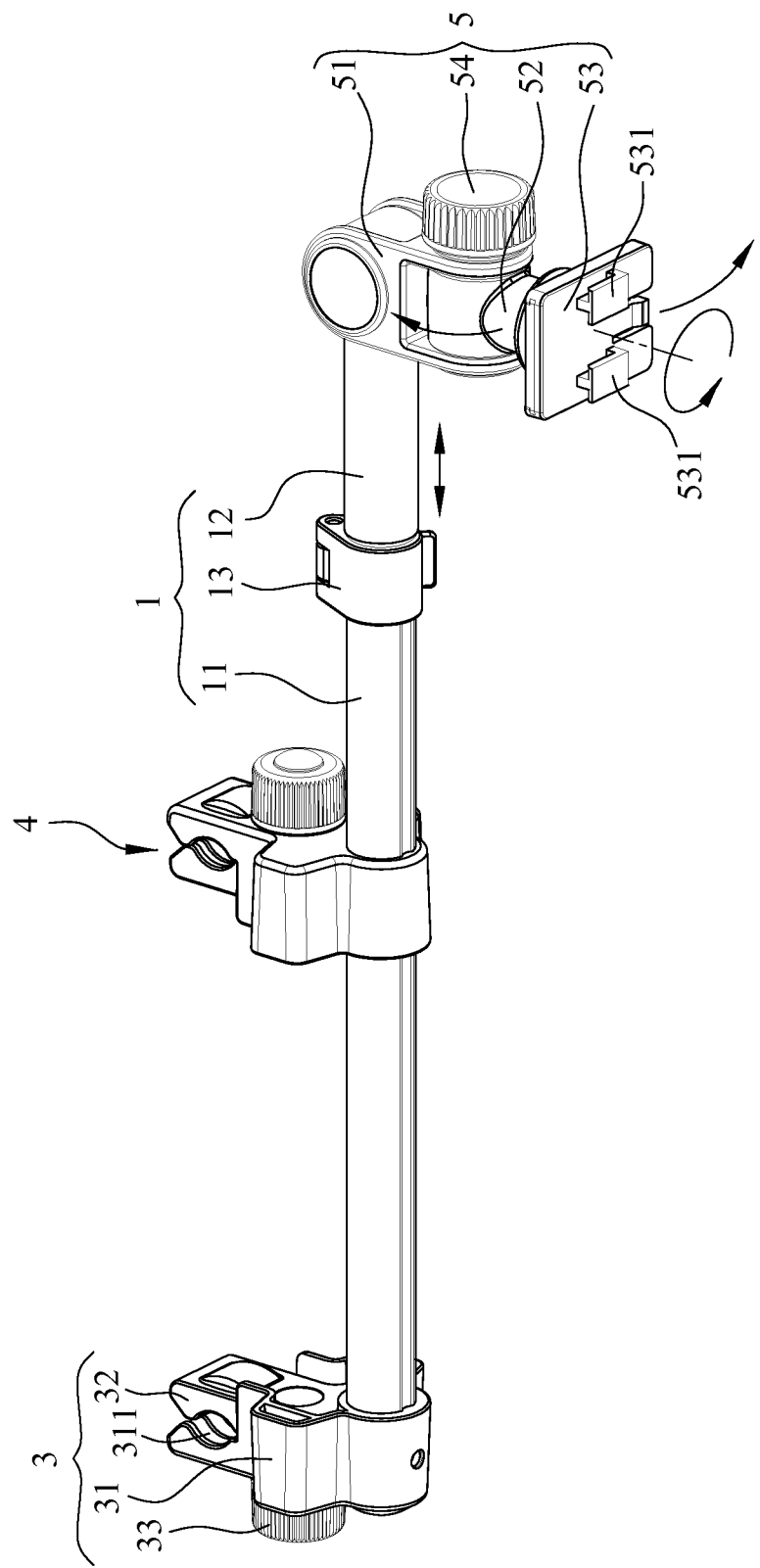
FIG. 1 shows a schematic 3D view of the first embodiment according to the present invention.

FIG. 1 shows a schematic view of the first embodiment according to the present invention. The positioning apparatus includes a retractable rod 1, two clamping units 3, 4 and a connection joint unit 5. The retractable rod 1 includes an extendible rod 12 able to move linearly so that the retractable rod 1 can extend or shorten the length. The two clamping units 3, 4 are disposed on a rod body 11 of the retractable rod 1. The connection joint unit 5 is disposed at the end of the exposed segment of the retractable rod 12. As such, the clamping units 3, 4 can clamp and fasten to the posts of the seat headrest in vehicle and the connection joint unit 5 provides engagement to an object, such as holding apparatus or support frame, to be mounted here. The position of the connection joint unit can be adjusted by adjusting the length of the extendible rod 12 of the retractable rod 1 for convenient viewing of en electronic device mounted to the connection joint unit 5, such as, moving the position from directly behind a single front seat to between the two front seats.

Figure 2:
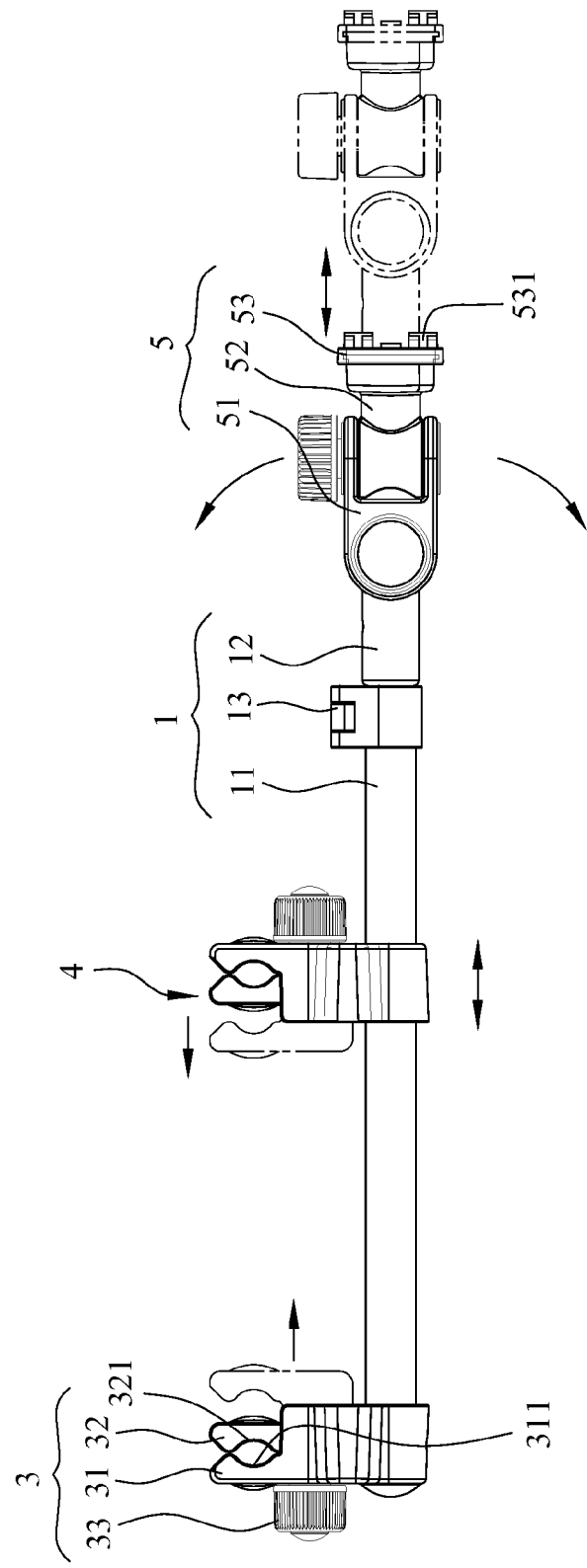
FIG. 2 shows a schematic side view of the first embodiment according to the present invention.

The following describes the components of the positioning apparatus. As shown in FIG. 1 and FIG. 2, the retractable rod 1 includes a rod body 11, an extendible rod 12 and a locking assembly 13. The rod body 11 is a hollow shell to accommodate a segment of the extendible rod 12 and allows the extendible rod 12 to move along the axis of the rod body 11 without being disengaged from the rod body 11. Neither of the cross-sections of the rod body 11 and extendible rod 12 is round so that extendible rod 12 is unable to rotate inside the rod body 11. The locking assembly 13 is disposed at the rod body 11 and is able to contact the extendible rod 12 when flipped so as to lock the relative position of the rod body 11 and extendible rod 12. The locking assembly 13 can be of a known structure.

The clamping units 3, 4 are disposed at the rod body 11 of the retractable rod 1, with the clamping unit 3 disposed and fixed to the end of the rod body 11 away from the extendible rod 12. While the clamping unit 4 is disposed at the rod body 11, the clamping unit 4 can move laterally along the surface of the rod so as to adjust the distance between the clamping unit 3 and the clamping unit 4 to accommodate different distance between the two headrests of the two front seats.

The clamping units can be embodied in different structures. In the present embodiment, the clamping unit 3 and the clamping unit are of the same structure. The clamping unit 3 includes a main clamping element 31, a movable clamping element 32 and a dial knob 33. The movable clamping element 32 is disposed to the main clamping element 31 and is only able to move linearly. The dial knob 33 matches the movable clamping element 32 based on thread principle. When the dial knob 33 is turned, the movable clamping element 32 moves linearly in accordance. The main clamping unit 31 includes a clamping area 311 of an arc shape. The movable clamping unit also includes a clamping area 321 of corresponding arc shape. To clamp, the two clamping areas 311, 321 clamps onto the posts of the seat headrest.

The connection joint unit 5 includes a first coupling element 51, a second coupling element 52 and a buckle element 53. The first coupling element 51 is coupled to the end of the extendible rod 12 and the second coupling element 52 is coupled to the first coupling element 51. The direction of adjustment for the first coupling element 51 is perpendicular to the direction adjustment for the second coupling element 52. The buckle element 53 is disposed to the end of the second coupling element 52 away from the coupling place and the buckle element 53 is rotatable. The function of the buckle element 53 is to provide engagement to the object to be mounted here. Therefore, the shape and the structure of the buckle element 53 can be varied to match the object to be mounted. In the present embodiment, the buckle element 53 includes at least a latch 531 of specific shape.

The direction of rotation for the first coupling element 51 is perpendicular to the direction of the force of the buckle element 53. Therefore, the first coupling element 51 and the extendible rod 12 can adopt a rotatable tight engagement for convenient angle locking after the adjustment. The direction of rotation for the second coupling element 52 is the same as the direction of the force of the buckle element 53. Therefore, the present invention further includes a dial knob 54, disposed at the coupling place of the second coupling element 52 to the first coupling element 51. When the dial knob 54 is rotated to tightness, the position of the second coupling element 52 is synchronously locked. Because the latch 531 is directional, the buckle element 53 is designed to allow rotation and position-locking, with the structure having a resilient positioning element inside the coupling place to the second coupling element 52 so as to fasten the position after rotation.

Figure 3:
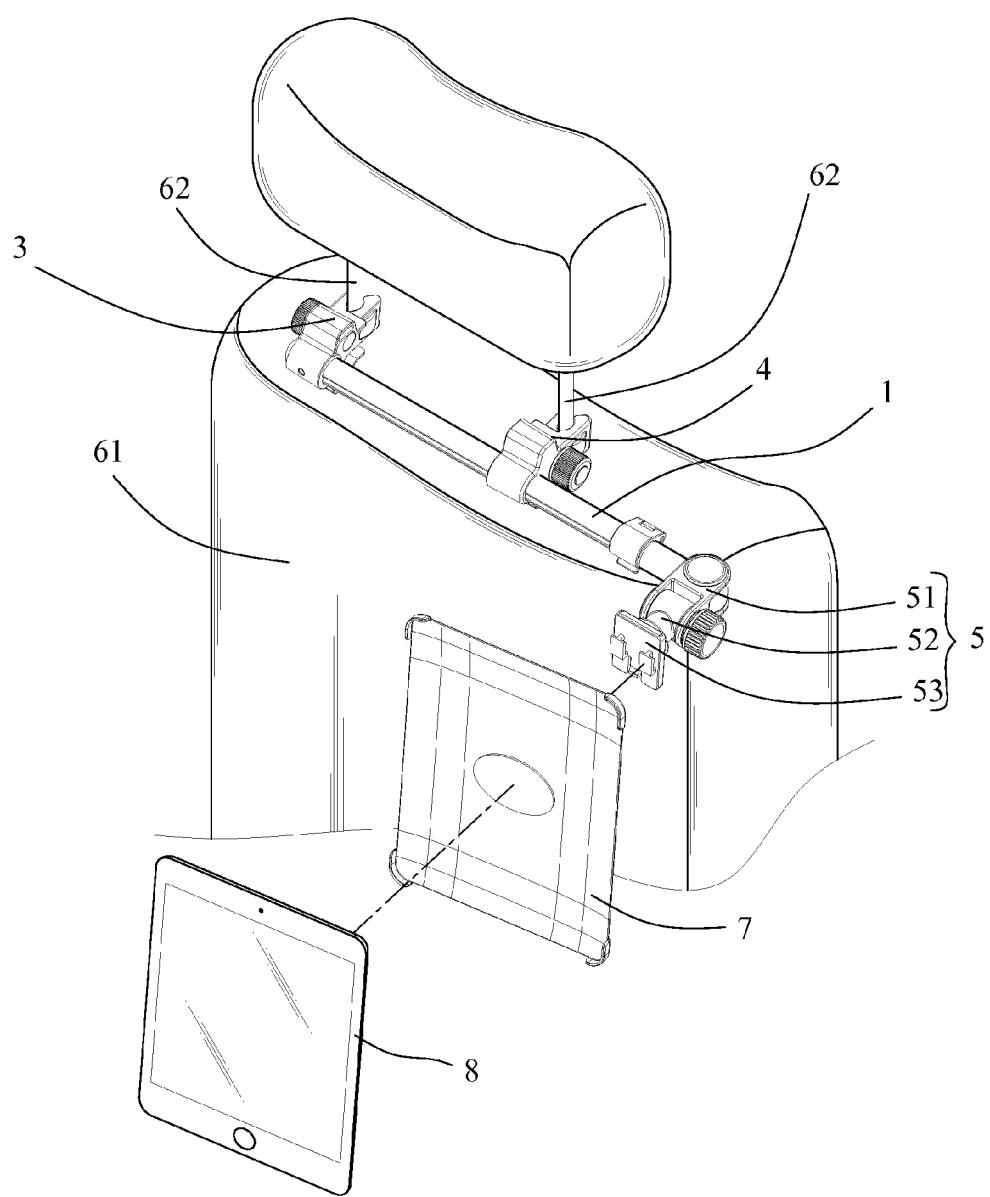
FIG. 3 shows a schematic view of the first embodiment mounted onto the posts of a seat headrest in vehicle according to the present invention.
Figure 4:
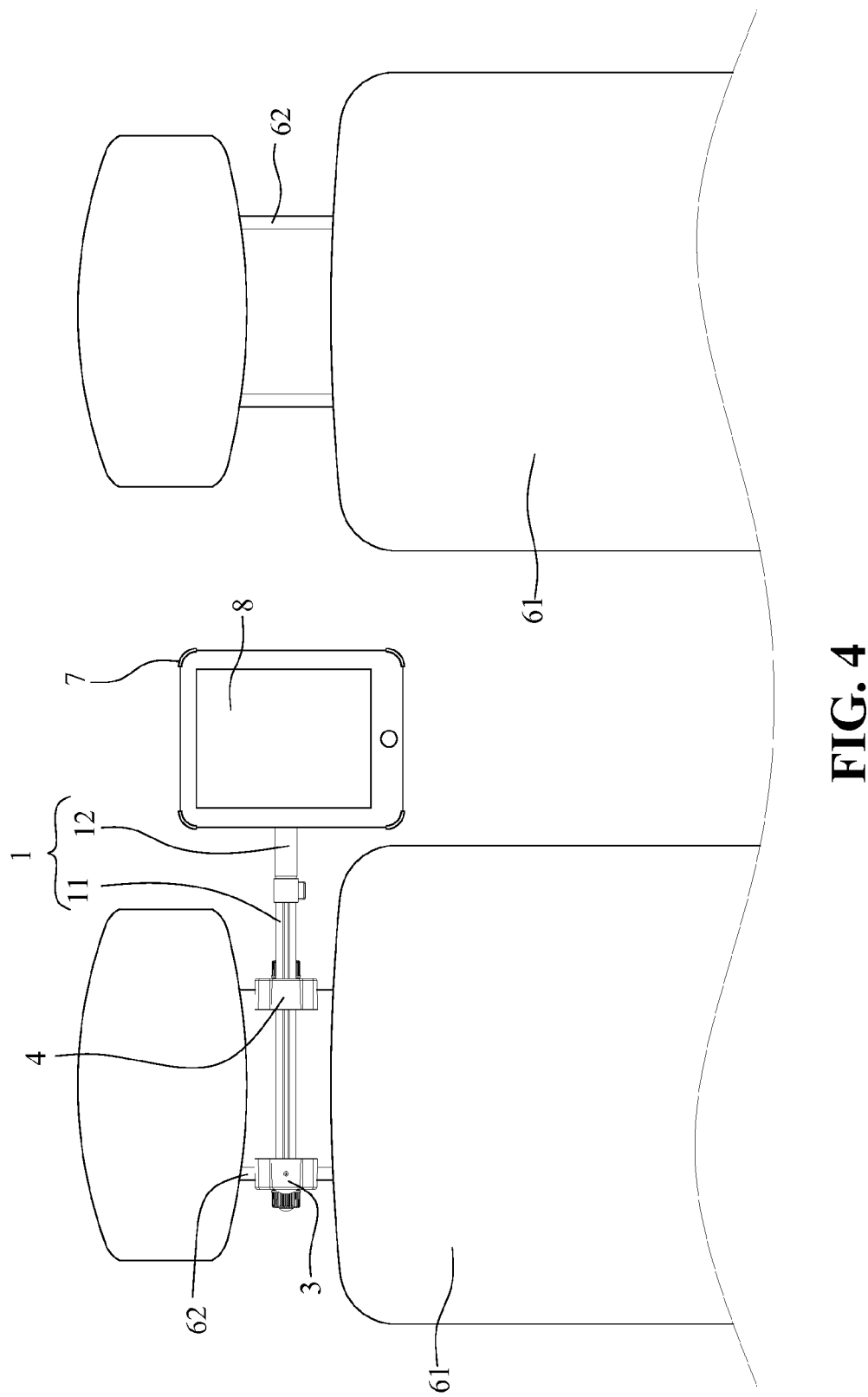
FIG. 4 shows a schematic view of the first embodiment in actual application in a vehicle according to the present invention.

FIG. 3 shows a schematic view of the present invention in actual application. The positioning apparatus is for mounting onto the headrest posts 62 of the seat 61 inside a vehicle. The clamping units 3, 4 clamp onto the posts 62 respectively. A carrier 7 can be mounted to the buckle element 53 of the connection joint unit 5. The carrier 7 is only an illustrative embodiment of the present invention, and the user is free to use different clamping device, support device or racks. An electronic device 8 can be held and fastened by the carrier 7. In the present embodiment, the electronic device 8 is a tablet. When a passenger in the back seat directly behind a front seat uses an electronic device, the retractable rod 1 can be shortened so that the electronic device 8 is close to the passenger for personal viewing. As shown in FIG. 4, when two passengers in the back seat intend to share the electronic device 8, the extendible rod 12 is extended and the electronic device 8 mounted onto the connection joint unit 5 moves to between the two front seats 61. As such, the two passengers can share the electronic device 8.

Figure 5:
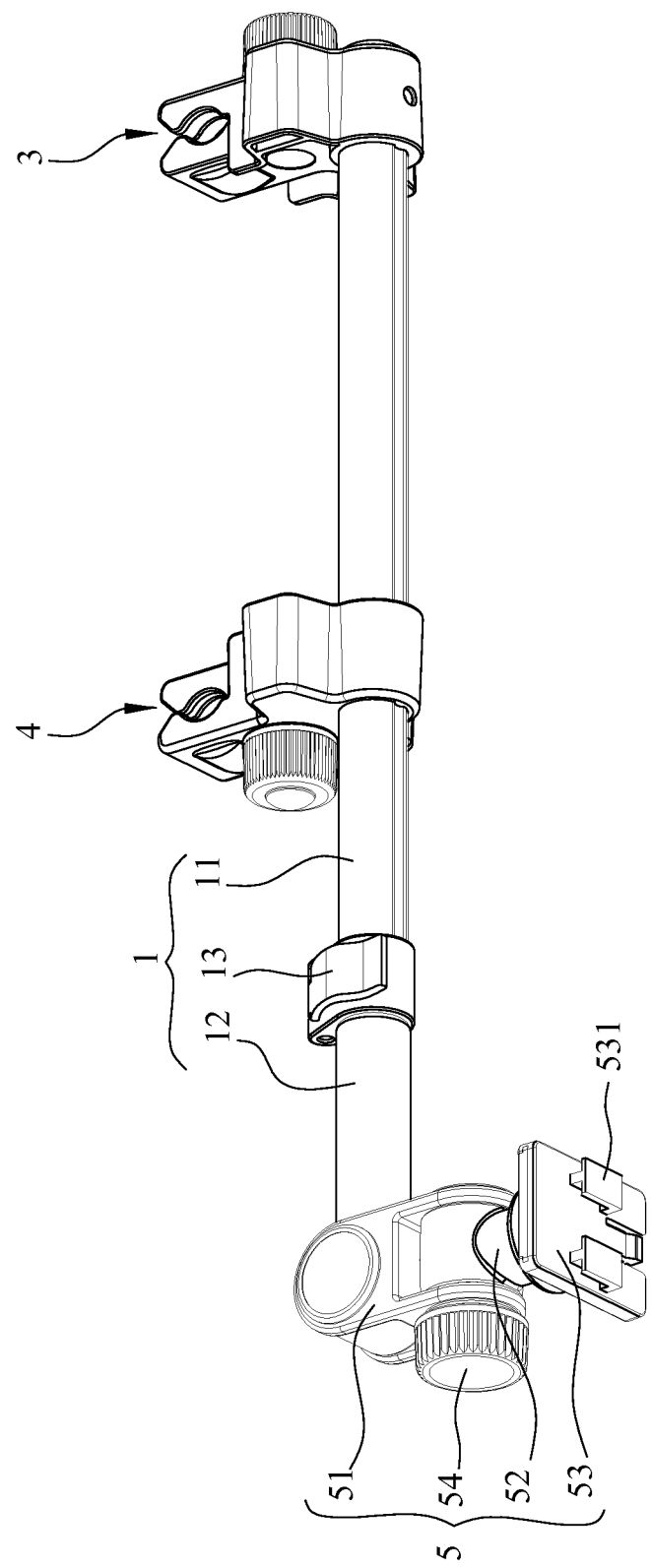
FIG. 5 shows another schematic view of the first embodiment mounted in a different configuration according to the present invention.

The positioning apparatus of the present invention can be mounted behind the right front seat or left front seat. Accordingly, the components of the connection joint unit 5 must be adjusted for different angles. When the present invention is mounted to the left front seat, the configuration is as shown in FIG. 1. When mounted to the right front seat, the configuration is as shown in FIG. 5, and the positioning apparatus must be rotated 180°. Because the latch 531 is directional, the buckle element 53 must be rotated 180° to facilitate the latch 531 to fasten the object to be mounted here.

Figure 6:
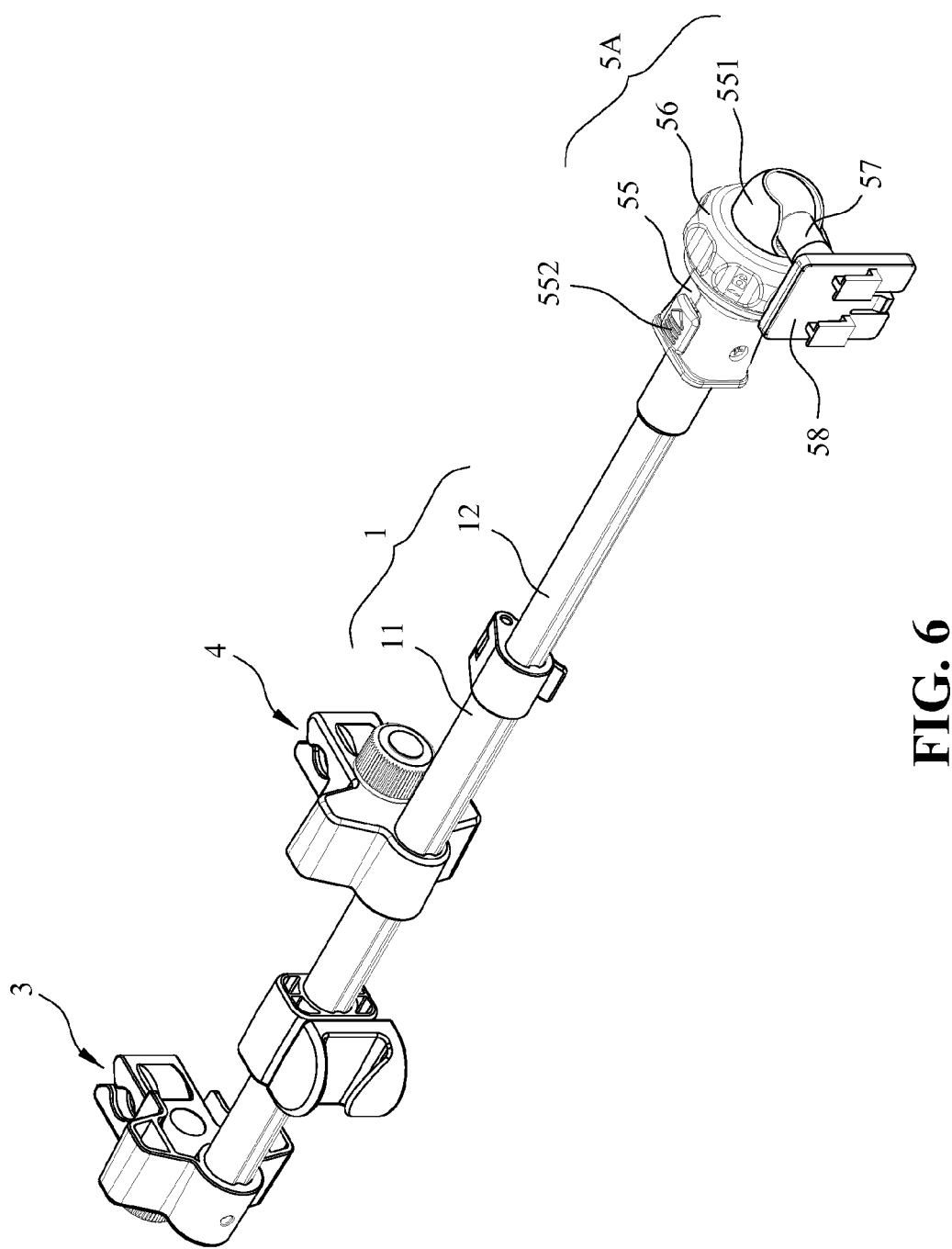
FIG. 6 shows a schematic 3D view of the second embodiment according to the present invention.
Figure 7:
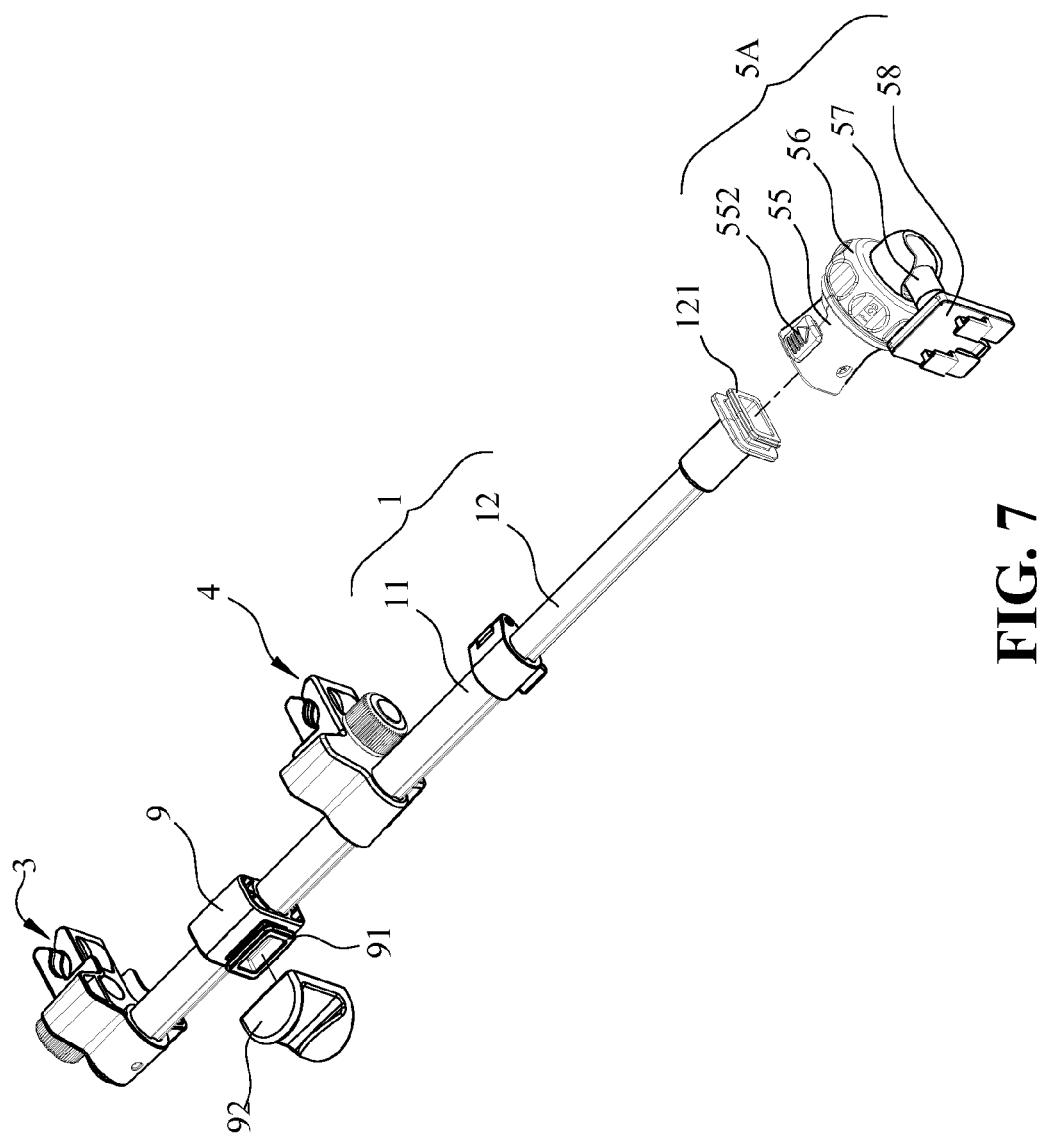
FIG. 7 shows a schematic dissected view of partial components of the second embodiment according to the present invention.

FIG. 6 and FIG. 7 show schematic view and dissected view of the second embodiment of the present invention, respectively. Compared to the first embodiment the main difference of the present embodiment is to change the structure of the connection joint unit 5A, and the remaining components, such as, retractable rod 1, clamping units 3, 4, stay the same as the first embodiment. In the present embodiment, the connection joint unit 5A is still disposed at the end of the extendible rod 12, and is a spherical connection base, characterized in that the adjustable angle is wider and provides more convenience. Because the spherical connection base can vary, the present invention only shows an illustrative embodiment. The connection joint unit 5A includes a fixed base 55, a dial locking element 56, a position adjustment element 57 and a buckle element 58. The fixed base 55 includes a sphere carrier base 551, the position adjustment element 57 has an end of spherical shape and is disposed to the sphere carrier base 551, and the dial locking element 56 is disposed to the sphere carrier base 551. After the dial locking element 56 is rotated to tightness, the internal structure of the dial locking element 56 can synchronously lock the position of the position adjustment element 57 on the sphere carrier base 551. The other end of the position adjustment element 57 is engaged to the buckle element 58. The function of the buckle element 58 is to provide engagement to the object to be mounted here, and thus, the shape and the structure of the buckle element 53 can vary to match the object to be mounted.

As shown in FIG. 6, although the connection joint unit 5A is disposed at the end of the extendible rod 12, the present invention uses a detachable manner for detachment and remounting. The present embodiment is only illustrative, instead of restrictive, in the detachable structure. The buckle block 121 is disposed at the end of the extendible rod 12 and the fixed base 55 of the connection joint unit 5A is disposed correspondingly with a matching engaging end. The outer surface of the fixed base 55 is disposed with a release button 552, which further controls the locking status. When the fixed base 55 is disposed at the buckle block 121, both are synchronously fixed. To release, the release button 552 must be triggered to unlock.

The present invention further includes an auxiliary element 9, disposed at the rod body 11, located between the clamping unit 3 and the clamping unit 4. The auxiliary element 9 can move along the rod body 11 linearly. In the present embodiment, the auxiliary element 9 is also disposed with a buckle block 91 of a specific shape. A hook 92 can be disposed to the buckle block 91 to provide hanging an object. When the hook 92 is removed, as the buckle block 91 and buckle block 121 have the same shape, the connection joint unit 5A can be disposed to the auxiliary element 9 when removed from the extendible rod 12. By using the auxiliary element 9 sliding on the rod body 11, the position of the connection joint unit 5A on the rod body 11 can be adjusted so that the electronic device can be moved to different positions behind the front seats.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A positioning apparatus for seat headrest posts in a vehicle, comprising:
    a retractable rod having an extendible rod able to extend and retract in a linear direction;
    a locking assembly disposed on an outer surface of the retractable rod, the locking assembly fastening a position of the extendible rod after a lateral adjustment of the retractable rod;
    at least two clamping units disposed on the retractable rod for clamping onto the seat headrest posts, each clamping unit including:
        a main clamping element having an arc-shaped clamping area;
        a movable clamping element attached to the main clamping element and being movable in only the linear direction and parallel to the retractable rod, the movable clamping element having an arc-shaped clamping area; and
        a rotatable dial knob that causes the movable clamping element to move linearly when the rotatable dial knob is rotated, so that the clamping area of the main clamping element and the clamping area of the movable clamping element clamp a respective seat headrest post therebetween; and
    a connection joint unit detachably disposed at an end of the extendible rod for engaging an object to be mounted thereon, and comprising:
        a fixed base having a sphere carrier base, and an engagement end;
        a dial locking element disposed at the sphere carrier base, and being rotatable;
        a position adjustment element having a spherical-shaped end disposed in the sphere carrier base, the position adjustment element being locked in position in the sphere carrier base when the dial locking element is rotated:
        a buckle element disposed on another end the position adjustment element distal from the spherical-shaped end; and
        a buckle block disposed at the end of the extendible rod, and having a shape matching a shape of the engagement end, the buckle block being engagable with the engagement end of the fixed base, so that the connection joint unit is detachably mountable to the end of the extendible rod.

2. The positioning apparatus as claimed in claim 1, further comprising an auxiliary element, disposed on a rod body of the retractable rod, and being located between the two clamping units.

* * * * *